(12) United States Patent
Tambat et al.

(10) Patent No.: US 9,182,982 B1
(45) Date of Patent: *Nov. 10, 2015

(54) TECHNIQUES FOR CREATING AN ENCRYPTED VIRTUAL HARD DISK

(75) Inventors: Ganesh Prabhakar Tambat, Pune (IN); Mohammed Eliyas Shaikh, Pune (IN); Saurabh Sitaram Karmarkar, Pune (IN)

(73) Assignee: Symantec Corporation, Mountain View, CA (US)

( * ) Notice: Subject to any disclaimer, the term of this patent is extended or adjusted under 35 U.S.C. 154(b) by 420 days.

This patent is subject to a terminal disclaimer.

(21) Appl. No.: 13/102,649

(22) Filed: May 6, 2011

(51) Int. Cl.
*G06F 9/00* (2006.01)
*G06F 15/177* (2006.01)
*G06F 9/44* (2006.01)

(52) U.S. Cl.
CPC ............... *G06F 9/00* (2013.01); *G06F 9/4406* (2013.01)

(58) Field of Classification Search
CPC ........................ G06F 9/4406; G06F 9/45558
USPC ................... 713/193, 189, 2; 707/609; 726/7; 711/112
See application file for complete search history.

(56) References Cited

U.S. PATENT DOCUMENTS

| | | | |
|---|---|---|---|
| 8,150,801 B2* | 4/2012 | Srivastava et al. | 707/609 |
| 2007/0294568 A1* | 12/2007 | Kanda et al. | 714/6 |
| 2008/0065909 A1* | 3/2008 | Chen | 713/193 |
| 2009/0240953 A1* | 9/2009 | Paul | 713/193 |
| 2009/0327755 A1* | 12/2009 | Ikeda et al. | 713/189 |
| 2010/0325713 A1* | 12/2010 | Kurita et al. | 726/7 |
| 2011/0061112 A1* | 3/2011 | Berengoltz et al. | 726/30 |
| 2011/0145496 A1* | 6/2011 | Whaley et al. | 711/112 |
| 2011/0276806 A1* | 11/2011 | Casper et al. | 713/189 |

* cited by examiner

*Primary Examiner* — Dustin Nguyen
(74) *Attorney, Agent, or Firm* — Wilmer Cutler Pickering Hale and Dorr LLP

(57) ABSTRACT

Techniques for creating an encrypted hard disk are disclosed. In one particular embodiment, the techniques may be realized as a method for encrypting a virtual hard disk comprising creating a volume of data for the virtual hard disk and encrypting the volume of data using a predetermined encryption algorithm. The method may also comprise mounting, via at least one computer processor, the encrypted volume of data onto the virtual hard disk.

20 Claims, 7 Drawing Sheets

TECHNIQUES FOR CREATING AN ENCRYPTED VIRTUAL HARD DISK

FIELD OF THE DISCLOSURE

The present disclosure relates generally to creating a virtual hard disk and, more particularly, to techniques for creating an encrypted virtual hard disk.

BACKGROUND OF THE DISCLOSURE

Virtual hard disk is a virtual hard disk (VHD) file format. The virtual hard disk file format is an unencrypted file format. For example, the unencrypted file format of the virtual hard disk allows content (e.g., backup virtual images written by backup applications) mounted on the virtual hard disk to be accessible by anyone. Thus, the unencrypted file format may be a threat to security and protection of the contents mounted on the virtual hard disk.

In view of the foregoing, it may be understood that there may be significant problems and shortcomings associated with current techniques for creating and using a virtual hard disk.

SUMMARY OF THE DISCLOSURE

Techniques for creating an encrypted hard disk are disclosed. In one particular embodiment, the techniques may be realized as a method for encrypting a virtual hard disk comprising creating a volume of data for the virtual hard disk and encrypting the volume of data using a predetermined encryption algorithm. The method may also comprise mounting, via at least one computer processor, the encrypted volume of data onto the virtual hard disk.

In accordance with other aspects of this particular embodiment, creating a volume of data may comprise creating a snapshot of the volume of data at a particular point in time.

In accordance with further aspects of this particular embodiment, encrypting the volume of data may comprise storing encryption metadata in the volume of data.

In accordance with additional aspects of this particular embodiment, the method may further comprise authenticating an encryption password.

In accordance with yet another aspect of this particular embodiment, authenticating an encryption password may comprise comparing the encryption password with the encryption metadata stored in the volume of data.

In accordance with still another aspect of this particular embodiment, the method may further comprise decrypting the encrypted volume of data using the encryption password based at least in part on an authentication of the encryption password.

In accordance with other aspects of this particular embodiment, decrypting the encrypted volume of data may comprise decrypting a portion of the encrypted volume of data.

In accordance with further aspects of this particular embodiment, decrypting the encrypted volume of data comprises decrypting an entire portion of the encrypted volume of data.

In accordance with additional aspects of this particular embodiment, at least one non-transitory processor readable storage medium storing a computer program of instructions configured to be readable by at least one processor for instructing the at least one processor to execute a computer process for performing the method as recited above.

In another particular embodiment, the techniques may be realized as a method for encrypting a virtual hard disk comprising creating a volume of data for the virtual hard disk and mounting, via at least one computer processor, the volume of data onto the virtual hard disk. The method may also comprise encrypting the mounted volume of data using a predetermined encryption algorithm.

In accordance with other aspects of this particular embodiment, creating a volume of data may comprise creating a snapshot of the volume of data at a particular point in time.

In accordance with further aspects of this particular embodiment, encrypting the mounted volume of data may comprise storing encryption metadata in the mounted volume of data.

In accordance with additional aspects of this particular embodiment, the method may further comprise authenticating an encryption password.

In accordance with yet another aspect of this particular embodiment, authenticating an encryption password may comprise comparing the encryption password with the encryption metadata stored in the volume of data.

In accordance with still another aspect of this particular embodiment, the method may further comprise decrypting the encrypted volume of data using the encryption password based at least in part on an authentication of the encryption password.

In accordance with other aspects of this particular embodiment, decrypting the encrypted volume of data may comprise decrypting a portion of the encrypted volume of data.

In accordance with further aspects of this particular embodiment, decrypting the encrypted volume of data may comprise decrypting an entire portion of the encrypted volume of data.

In accordance with additional aspects of this particular embodiment, at least one non-transitory processor readable storage medium storing a computer program of instructions configured to be readable by at least one processor for instructing the at least one processor to execute a computer process for performing the method as recited above.

In another particular embodiment, the techniques may be realized as a system for encrypting a virtual hard disk comprising a backup module configured to create a volume of data for the virtual hard disk and an encryption module configured to encrypt the volume of data using a predetermined encryption algorithm. The system may also comprise a mounting module comprising at least one computer processor configured to mount the encrypted volume of data onto the virtual hard disk.

In another particular embodiment, the technique(s) may be realized as a system for encrypting a virtual hard disk comprising a backup module configured to create a volume of data for the virtual hard disk and a mounting module comprising a computer processor configured to mount the volume of data onto the virtual hard disk. The system may also comprise an encryption module configured to encrypt the mounted volume of data using a predetermined encryption algorithm.

The present disclosure will now be described in more detail with reference to particular embodiments thereof as shown in the accompanying drawings. While the present disclosure is described below with reference to particular embodiments, it should be understood that the present disclosure is not limited thereto. Those of ordinary skill in the art having access to the teachings herein will recognize additional implementations, modifications, and embodiments, as well as other fields of use, which are within the scope of the present disclosure as described herein, and with respect to which the present disclosure may be of significant utility.

BRIEF DESCRIPTION OF THE DRAWINGS

In order to facilitate a fuller understanding of the present disclosure, reference is now made to the accompanying drawings, in which like elements are referenced with like numerals. These drawings should not be construed as limiting the present disclosure, but are intended to be illustrative only.

DETAILED DESCRIPTION OF EMBODIMENTS

Figure 1:
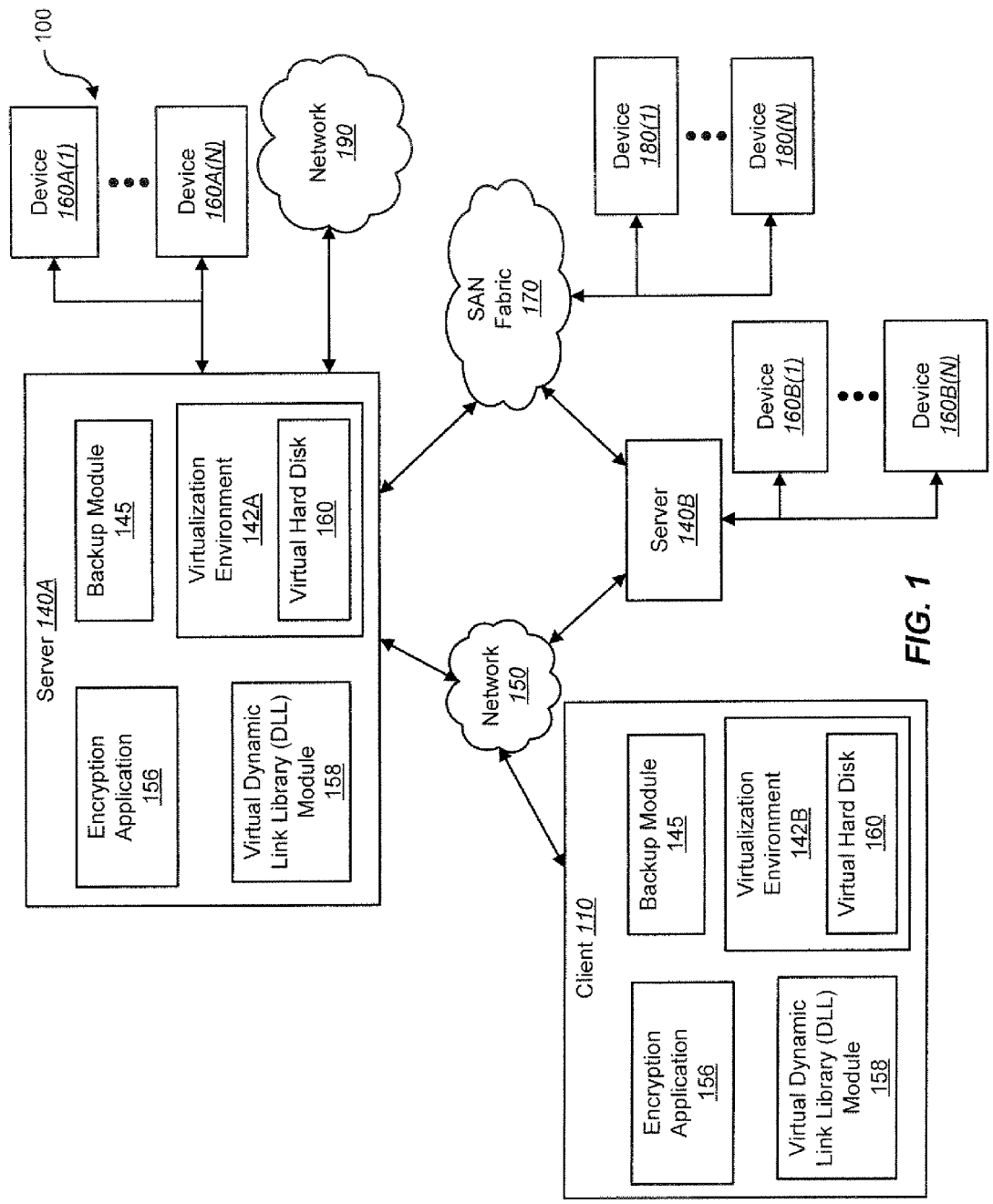
FIG. 1 shows a block diagram depicting a network architecture for creating an encrypted virtual hard disk in accordance with an embodiment of the present disclosure.

FIG. 1 shows a block diagram depicting a network architecture 100 for creating an encrypted virtual hard disk in accordance with an embodiment of the present disclosure. Figure is a simplified view of network architecture 100, which may include additional elements that are not depicted. Network architecture 100 may contain a client 110 and servers 140A and 140B (one or more of which may be implemented using computer system 200 shown in FIG. 2). Client 110 may be communicatively coupled to a network 150. Server 140A may be communicatively coupled to networks 190 and 150. Server 140B may be communicatively coupled to storage devices 160A(1)-(N). Server 140B may be communicatively coupled to a SAN (Storage Area Network) fabric 170. SAN fabric 170 may support access to storage devices 180(1)-(N) by server 140B, and by network element 110 via network 150.

The description below describes network elements, computers, and/or components of a system and method for creating an encrypted virtual hard disk that may include one or more modules. As used herein, the term "module" may be understood to refer to computing software, firmware, hardware, and/or various combinations thereof. Modules, however, are not to be interpreted as software which is not implemented on hardware, firmware, or recorded on a processor readable recordable storage medium (i.e., modules are not software per se). It is noted that the modules are according to a particular embodiment. The modules may be combined, integrated, separated, and/or duplicated to support various applications. Also, a function described herein as being performed at a particular module may be performed at one or more other modules and/or by one or more other devices instead of or in addition to the function performed at the particular module. Further, the modules may be implemented across multiple devices and/or other components local or remote to one another. Additionally, the modules may be moved from one device and added to another device, and/or may be included in both devices.

Servers 140A and 1402 may be communicatively coupled to a SAN (Storage Area Network) fabric 170. SAN fabric 170 may support access to storage devices 180(1)-(N) by servers 140A and 140B, and by client 110 via network 150. Server 140A may be communicatively coupled to network 190. According to some embodiments, server 140A may be a proxy server, a datacenter, and/or other network device capable of crating one or more virtual hard disks. Server 140A may be communicatively coupled to network 190.

Server 140A may comprise a platform for hosting a virtualization environment 142. For example, the virtualization environment 142A may be capable of hosting an encrypted virtual hard disk 160. The server 140A may comprise a backup module 145. For example, the backup module 145 may be capable of creating backup contents such as, for example, virtual backup file images for the virtual hard disk 160. In a particular embodiment, the backup module 145 may include a backup exec system recovery (BEER) application to create virtual backup file images to be mounted onto the virtual hard disk 160. The server 140A may also comprise an encryption application 156 for encrypting the backup contents of the virtual hard disk 160. For example, the encryption application 156 may include an endpoint encryption (EE) application that may encrypt the backup contents of the virtual hard disk 160. In a particular embodiment, the encryption application 156 may provide encryption metadata as part of the backup contents for the virtual hard disk 160. Sever 140A further comprise a virtual dynamic link library (DLL) module 158 to mount the encrypted backup contents to the virtual hard disk 160. The virtual dynamic link library (DLL) module 158 may also decrypt the encrypted backup contents of the virtual hard disk 160 via encryption metadata to access the encrypted backup contents from the virtual hard disk 160. It may be appreciated by one of skilled in the art that a plurality of encrypted virtual hard disks 160 may be created in order to provide security and protection for the backup contents.

The client 110 may be communicatively coupled to the server 140A via the network 150. For example, the client 110 may comprise a platform for hosting a virtualization environment 142. The virtualization environment 142B of the client 110 may be capable of hosting an encrypted virtual hard disk 160 as the server 140A. The client 110 may comprise similar modules (e.g., backup module 145, encryption application 156, and/or virtual dynamic link library (DLL) module 158) as the server 140A in order to create an encrypted virtual hard disk 160. According to some embodiments, virtualization environment 142A-B may be a hypervisor or a Virtual Machine Manager (VMM) hosted by the client 110 or server 140A.

Virtualization may occur at different levels of abstraction. According to some embodiments, virtual hard disk 160 may abstract at a hardware level and may sit on top of an operating system (e.g., VMware workstation and Microsoft Virtual PC/Server). According to other embodiments, virtual hard disk 160 may abstract at a hardware level and may not be on top of an operating system (i.e., they may be bare-metal implementations). Virtual hard disk 160 may also, according to some embodiments, abstract at other levels including, but not limited to, Operating System (OS) level, OS system call level, instruction set emulation, application-binary interface emulation, user-level OS emulation, etc.

Figure 2:
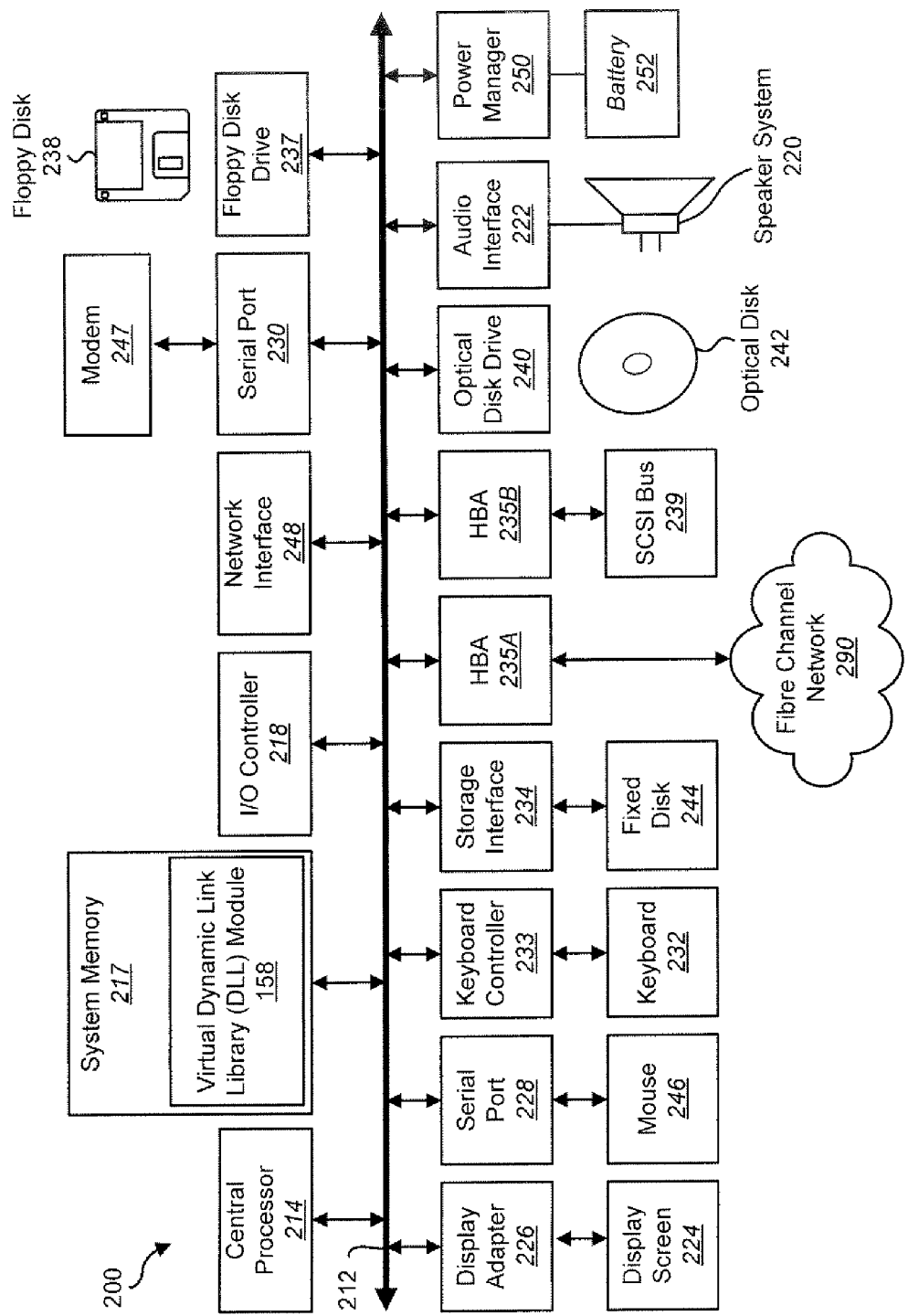
FIG. 2 depicts a block diagram of a computer system in accordance with an embodiment of the present disclosure.

With reference to computer system 200 of FIG. 2, modem 247, network interface 248, or some other method may be used to provide connectivity from of client 110 to network 150. Client 110 may be able to access information on server 140A or 140B using, for example, a web browser or other client software. Such a client software may allow client 110 to access data hosted by servers 140A or 140B or one of storage devices 160A(1)-(N), 160B(1)-(N), and/or 180(1)-(N).

Networks 150 and 190 may be local area networks (LANs), wide area networks (WANs), the Internet, cellular networks, satellite networks, or other networks that permit communication between client 110, servers 140A and 140B, and other devices communicatively coupled to networks 150 and 190.

Networks 150 and 190 may further include one, or any number, of the particular types of networks mentioned above operating as a stand-alone network or in cooperation with each other. Networks 150 and 190 may utilize one or more protocols of one or more client 110 or servers 140A and 140E to which they are communicatively coupled. Networks 150 and 190 may translate to or from other protocols to one or more protocols of network devices. Although networks 150 and 190 are each depicted as one network, it should be appreciated that according to one or more embodiments, networks 150 and 190 may each comprise a plurality of interconnected networks.

Storage devices 160A(1)-(N), 160B(1)-(N), and/or 180(1)-(N) may be network accessible storage and may be local, remote, or a combination thereof to server 140A or 140B. Storage devices 160A(1)-(N), 160B(1)-(N), and/or 180(1)-(N) may utilize a redundant array of inexpensive disks ("RAID"), magnetic tape, disk, a storage area network ("SAN"), an internet small computer systems interface ("iSCSI") SAN, a Fibre Channel SAN, a common Internet File System ("CIFS"), network attached storage ("NAS"), a network file system ("NFS"), optical based storage, or other computer accessible storage. Storage devices 160A(1)-(N), 160B(1)-(N), and/or 180(1)-(N) may be used for backup or archival purposes.

According to some embodiments, client 110 may be a smartphone, PDA, desktop computer, a laptop computer, a server, another computer, or another device coupled via a wireless or wired connection to network 150. Client 110 may receive data from user input, a database, a file, a web service, and/or an application programming interface. According to some embodiments, client 110 may be a mobile client such as, for example, a smart phone.

Servers 140A and 140B may be application servers, archival platforms, virtualization environment platforms, backup servers, network storage devices, media servers, email servers, document management platforms, enterprise search servers, or other devices communicatively coupled to network 150. Servers 140A and 140B may utilize one of storage devices 160A(1)-(N), 160B(1)-(N), and/or 180(1)-(N) for the storage of application data, backup data, or other data. Servers 140A and 140E may be hosts, such as an application server, which may process data traveling between client 110 and a backup platform, a backup process, and/or storage. According to some embodiments, servers 140A and 140B may be platforms used for backing up and/or archiving data.

According to some embodiments, virtual dynamic link library (DLL) module 158 may mount encrypted backup contents to the virtual hard disk 160. The virtual dynamic link library (DLL) module 158 may provide an interface between the virtual hard disk 160 and the backup module 145. The virtual dynamic link library (DLL) module 158 may decrypt the encrypted backup contents of the virtual hard disk 160. For example, the virtual dynamic link library (DLL) module 158 may decrypt the encrypted backup contents of the virtual hard disk 160 via encryption metadata.

FIG. 2 depicts a block diagram of a computer system 200 in accordance with an embodiment of the present disclosure. Computer system 200 is suitable for implementing techniques in accordance with the present disclosure. Computer system 200 may include a bus 212 which may interconnect major subsystems of computer system 200, such as a central processor 214, a system memory 217 (e.g. RAM (Random Access Memory), ROM (Read Only Memory), flash RAM, or the like), an Input/Output (I/O) controller 218, an external audio device, such as a speaker system 220 via an audio output interface 222, an external device, such as a display screen 224 via display adapter 226, serial ports 228 and 230, a keyboard 232 (interfaced via a keyboard controller 233), a storage interface 234, a floppy disk drive 237 operative to receive a floppy disk 238, a host bus adapter (HBA) interface card 235A operative to connect with a Fibre Channel network 290, a host bus adapter (HBA) interface card 235B operative to connect to a SCSI bus 239, and an optical disk drive 240 operative to receive an optical disk 242. Also included may be a mouse 246 (or other point-and-click device, coupled to bus 212 via serial port 228), a modem 247 (coupled to bus 212 via serial port 230), network interface 248 (coupled directly to bus 212), power manager 250, and battery 252.

Bus 212 allows data communication between central processor 214 and system memory 217, which may include read-only memory (ROM) or flash memory (neither shown), and random access memory (RAM) (not shown), as previously noted. The RAM may be the main memory into which the operating system and application programs may be loaded. The ROM or flash memory can contain, among other code, the Basic Input-Output system (BIOS) which controls basic hardware operation such as the interaction with peripheral components. Applications resident with computer system 210 may be stored on and accessed via an non-transitory computer readable medium, such as a hard disk drive (e.g., fixed disk 244), an optical drive (e.g., optical drive 240), a floppy disk unit 237, or other storage medium. For example, the virtual dynamic link library (DLL) module 158 may be resident in system memory 217.

Storage interface 234, as with the other storage interfaces of computer system 210, can connect to a standard computer readable medium for storage and/or retrieval of information, such as a fixed disk drive 244. Fixed disk drive 244 may be a part of computer system 210 or may be separate and accessed through other interface systems. Modem 247 may provide a direct connection to a remote server via a telephone link or to the Internet via an Internet service provider (ISP). Network interface 248 may provide a direct connection to a remote server via a direct network link to the Internet via a POP (point of presence). Network interface 248 may provide such connection using wireless techniques, including digital cellular telephone connection, Cellular Digital Packet Data (CDPD) connection, digital satellite data connection or the like.

Many other devices or subsystems (not shown) may be connected in a similar manner (e.g., document scanners, digital cameras and so on). Conversely, all of the devices shown in FIG. 2 need not be present to practice the present disclosure. The devices and subsystems can be interconnected in different ways from that shown in FIG. 2. Code to implement the present disclosure may be stored in a non-transitory computer-readable storage media such as one or more of system memory 217, fixed disk 244, optical disk 242, or floppy disk 238. Code to implement the present disclosure may also be received via one or more interfaces and stored in memory. The operating system provided on computer system 210 may be MS-DOS®, MS-WINDOWS®, OS/2®, OS X®, UNIX®, Linux®, or another known operating system.

Power manager 250 may monitor a power level of battery 252. Power manager 250 may provide one or more APIs (Application Programming Interfaces) to allow determination of a power level, of a time window remaining prior to shutdown of computer system 200, a power consumption rate, an indicator of whether computer system is on mains (e.g., AC Power) or battery power, and other power related information. According to some embodiments, APIs of power manager 250 may be accessible remotely (e.g., accessible to a remote backup management module via a network connection). According to some embodiments, battery 252 may be an Uninterruptable Power Supply (UPS) located either local to or remote from computer system 200. In such embodiments, power manager 250 may provide information about a power level of an UPS.

Figure 3:
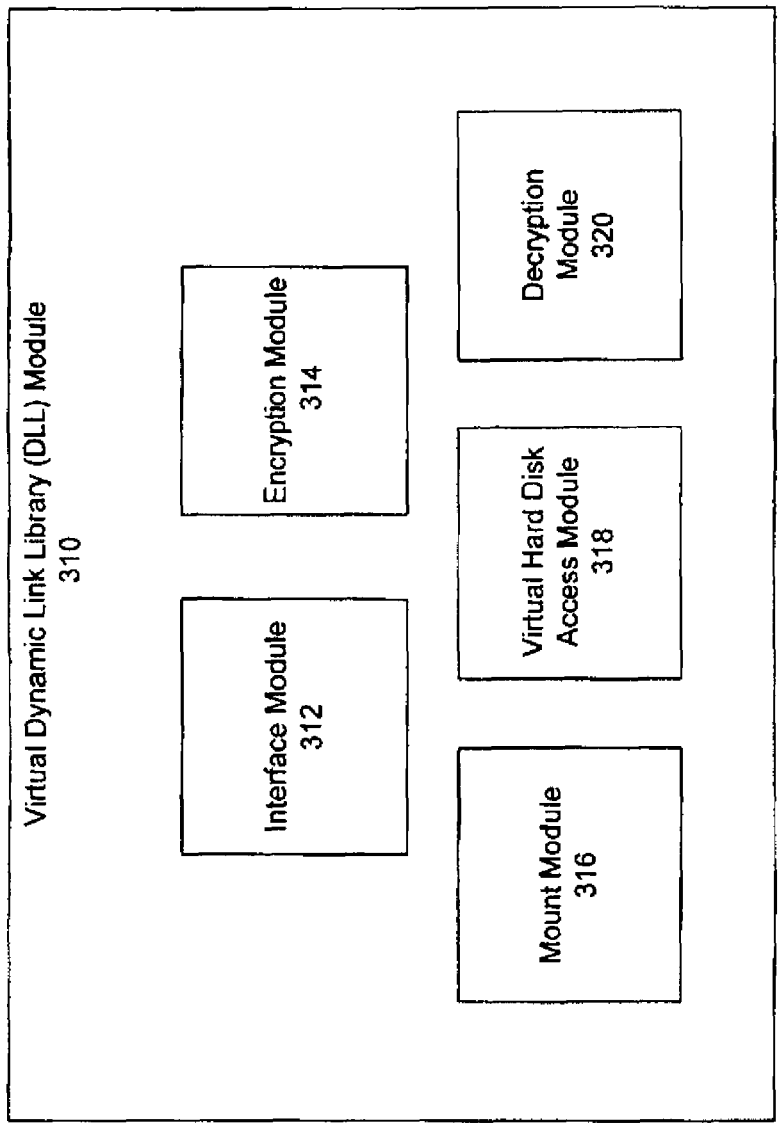
FIG. 3 shows a security virtual machine in accordance with an embodiment of the present disclosure.

Referring to FIG. 3, there is shown a virtual dynamic link library (DLL) module 310 in accordance with an embodiment of the present disclosure. As illustrated, the virtual dynamic link library (DLL) module 310 may contain one or more components including an interface module 312, an encryption module 314, a mount module 316, a virtual hard disk access module 318, and/or a decryption module 320.

The interface module 312 may receive backup contents from the backup module 145. For example, the interface module 312 may receive virtual backup file images from the backup module 145. The interface module 312 may process the virtual backup file images. For example, the interface module 312 may filter, format, segregate, congregate, and/or eliminate the virtual backup file images. The backup contents received from the backup module 145 may have various formats. For example, the backup module 145 may format the backup contents in an appropriate format.

In a particular embodiment, the interface module 312 may receive encrypted backup contents from the encryption application 156. The encrypted backup contents may include encryption metadata stored within the encrypted backup contents. In a particular embodiment, the encryption metadata may be stored in one or more virtual backup file images of the backup contents. In another embodiment, the encryption metadata may be associated with one or more virtual backup files of the backup contents. The interface module 312 may receive backup contents that may not be encrypted. The interface module 312 may provide the backup contents to the encryption module 314. The encryption module 314 may encrypt the backup contents and provide encryption metadata for the encrypted backup contents. For example, the encryption module 314 may provide the encryption metadata within one or more virtual backup file images of the encrypted backup contents.

The mount module 316 may comprise at least one processor and a driver for mounting encrypted backup contents to the virtual hard disk 160. For example, the mount module 316 may receive encrypted backup contents from the interface module 312 and/or encryption module 314. The mount module 316 may mount the encrypted backup contents to the virtual hard disk 160.

Users may access backup contents stored in the virtual hard disk 160 via the virtual hard disk access module 318. For example, the users may request to access one or more virtual backup file images stored in the virtual hard disk 160. The virtual hard disk access module 318 may access the virtual hard disk 160 based at least in part on the user request. The virtual hard disk access module 318 may obtain the encrypted backup contents from the virtual hard disk 160 based at least in part on the user request.

The encrypted backup contents may be decrypted by the decryption module 320. For example, the decryption module 320 may have an encryption password associated with the encrypted backup contents. The decryption module 320 may receive the encryption password from the encryption module 158 and/or the encryption module 314. The decryption module 320 may decrypt the encrypted backup contents via the encryption password. For example, the decryption module 320 may authenticate the encryption password against the encryption metadata stored in the backup contents in order to decrypt the encrypted backup contents.

Figure 4:
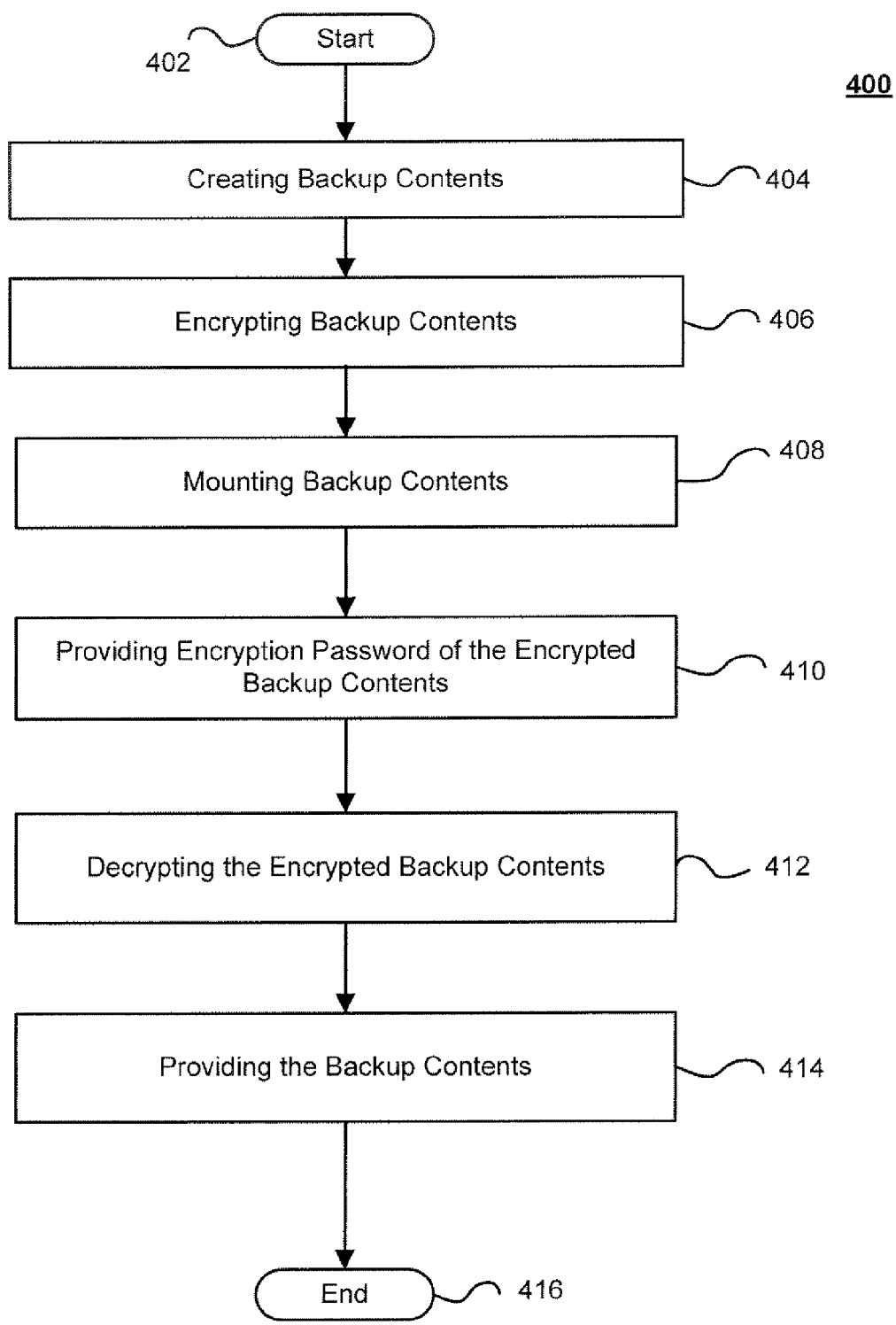
FIG. 4 depicts a method for creating an encrypted virtual hard disk in accordance with an embodiment of the present disclosure.

Referring to FIG. 4, there is depicted a method 400 for creating an encrypted virtual hard disk in accordance with an embodiment of the present disclosure. At block 402, the method 400 may begin.

At block 404, a volume of backup contents may be created for the virtual hard disk 160. For example, backup module 145 may create a snapshot of the volume of backup contents having at least one virtual backup file image at a particular point in time at a particular point in time. A snapshot of the volume of backup contents may be a copy or a logical representation of the backup content at the particular point of time. A volume of backup contents may be a drive (e.g., C drive, D drive, E drive, etc) of backup contents. In a particular embodiment, the backup module 145 may include a backup exec system recovery (BESR) application to create a volume of backup contents having at least one virtual backup file image to be mounted onto the virtual hard disk 160. The backup module 145 may create a volume of backup contents having one or more blocks, wherein each of the one or more blocks having at least one virtual backup file image.

At block 406, the backup contents may be encrypted using a predetermine encryption algorithm. In a particular embodiment, the snapshot of the volume of backup contents may be encrypted by the encryption application 156. In another embodiment, the snapshot of the volume of backup contents may be encrypted by the encryption module 314. Encryption key may be stored within the encrypted backup contents. For example, the encryption metadata may be stored within a virtual backup file image of the volume of backup contents. The encryption metadata may be associated with virtual backup files of the volume of backup contents.

At block 408, the encrypted volume of backup contents may be mounted to the virtual hard disk 160. For example, the mount module 316 may mount the encrypted snapshot of the volume of backup contents to the virtual hard disk 160. The mount module 316 may treat the encrypted snapshot of the volume of backup contents as unencrypted volume of backup contents. For example, the mount module 316 may not recognize that the snapshot of the volume of backup contents are encrypted and may mount the encrypted volume of backup contents as if the backup contents are not encrypted. Thus, the encrypted volume of backup contents may be protected from hacking or tampering from unauthorized sources.

At block 410, encryption password associated with the volume of encrypted backup contents may be provided to the decryption module 312. For example, the encryption application 156 may provide encryption metadata associated with the volume of the encrypted backup contents to the decryption module 312. In another example, the encryption module 314 may provide encryption metadata associated with the volume of the encrypted backup contents to the decryption module 312.

The decryption module 312 may authenticate the encryption password against the encryption metadata stored in the volume of backup contents. In a particular embodiment, the decryption module 312 may search the snapshot of the volume of backup contents to find the encryption metadata stored therein. The decryption module 312 may authenticate the encryption password by comparing the encryption metadata stored within the snapshot of the volume of backup contents with the provided encryption password. The decryption module 312 may determine that the encryption password is authentic if the encryption metadata stored within the snapshot of the volume of backup contents matches the provided encryption password.

At block 412, the encrypted volume of backup contents may be decrypted by the decryption module 312. The decryption module 312 may decrypt a selected portion of the encrypted volume of backup contents via the encryption password. For example, a user may select to decrypt a part of the encrypted volume of backup contents, the decryption module 312 may decrypt the selected part of the encrypted volume of backup contents via the encryption password.

At block 414, the decrypted volume of backup contents may be provided to the user. For example, the decryption module 314 may provide the selected portion of the decrypted volume of backup contents to the mount module 316. The mount module 316 may read the decrypted volume of backup contents and provide the backup contents to the user.

At block 416, the method 400 may end.

Figure 5:
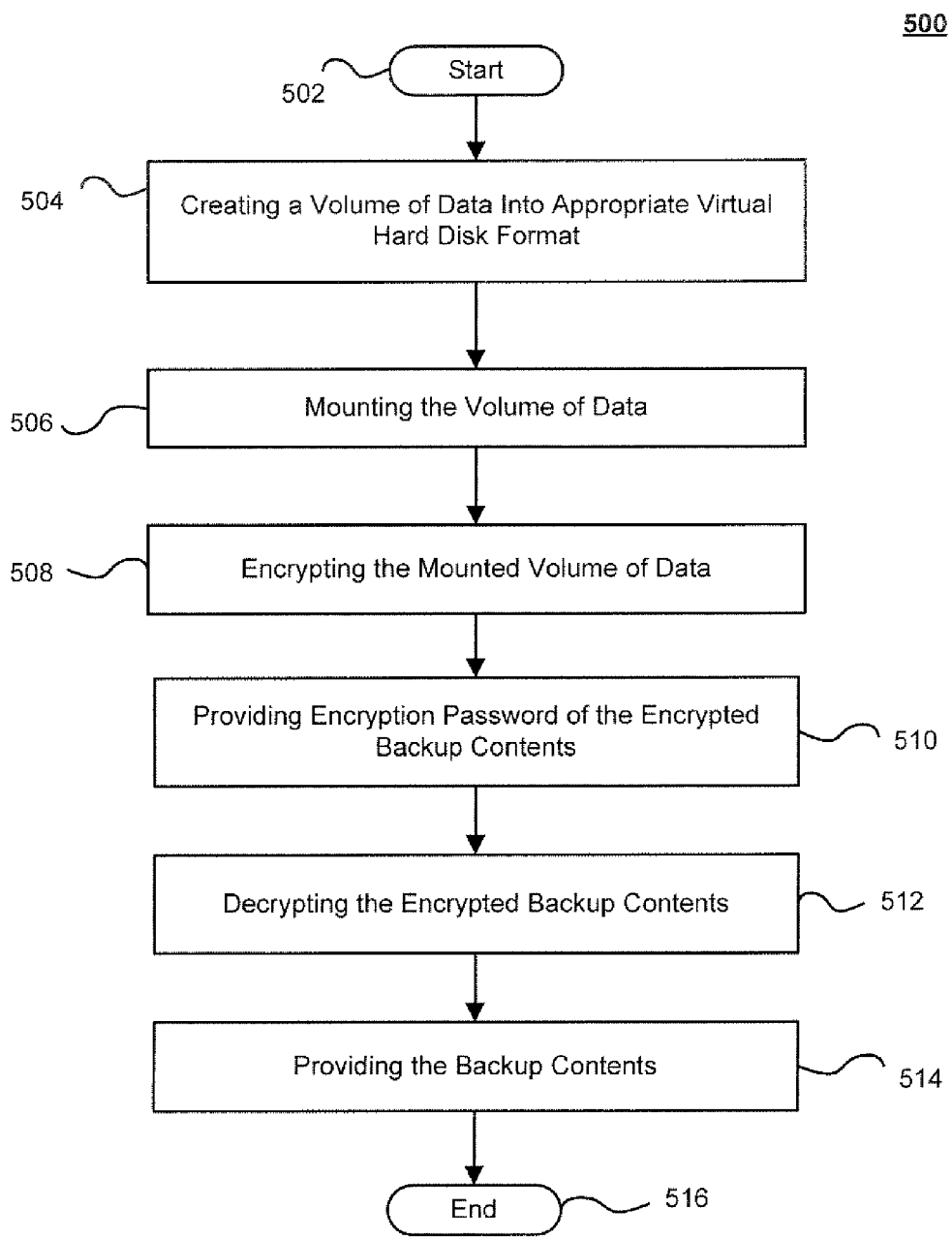
FIG. 5 depicts a method for decrypting the virtual hard disk in accordance with an embodiment of the present disclosure.

Referring to FIG. 5, there is depicted a method 500 for creating an encrypted virtual hard disk in accordance with an embodiment of the present disclosure. At block 502, the method 500 may begin.

At block 504, the volume of data may be converted into appropriate virtual hard disk format. The volume of data may be converted into virtual backup file images via the backup module 145. For example, backup module 145 may create a snapshot of the volume of data having at least one virtual backup file image. A snapshot of the volume of backup contents may be a copy or a logical representation of the volume of data at the particular point of time. In a particular embodiment, the backup module 145 may include a backup exec system recovery (BESR) application to create a volume of data having at least one virtual backup file image to be mounted onto the virtual hard disk 160. The backup module 145 may create one or more blocks of snapshots of the volume of data, wherein each of the one or more blocks having at least one virtual backup file image.

At block 506, the snapshot of the volume of data may be mounted to the virtual hard disk 160. For example, the mount module 316 may mount the snapshot of the volume of data to the virtual hard disk 160. The mount module 316 may sequentially mount the one or more blocks of the snapshots of the volume of data to the virtual hard disk 160.

At block 508, the mounted volume of data may be encrypted using a predetermine encryption algorithm. In a particular embodiment, the mounted volume of data may be encrypted by the encryption module 314. Encryption metadata may be stored within the mounted volume of data. For example, the encryption metadata may be stored within a virtual backup file image of the mounted volume of data. Thus, the encrypted volume of data may be protected from hacking or tampering from unauthorized sources.

In another embodiment, the mounted volume of data may be encrypted by the encryption application 156 via an encryption algorithm. Encryption metadata may be stored within the mounted volume of data. For example, the encryption metadata may be stored within a virtual backup file image of the mounted volume of data. The encryption of the volume of data may prevent hacking or unauthorized access of the volume of data during transfer.

At block 510, encryption password associated with the volume of encrypted data may be provided to the decryption module 312. For example, the encryption module 314 may provide encryption metadata associated with the volume of the encrypted data to the decryption module 312.

At block 512, the encrypted volume of data may be decrypted by the decryption module 312. For example, the decryption module 312 may authenticate the encryption password against the encryption metadata stored in the volume of encrypted data. The decryption module 312 may decrypt the encrypted volume of data. The decryption module 312 may authenticate the encryption password against the encryption metadata stored in the volume of backup contents. In a particular embodiment, the decryption module 312 may search the snapshot of the volume of backup contents to find the encryption metadata stored therein. The decryption module 312 may authenticate the encryption password by comparing the encryption metadata stored within the snapshot of the volume of backup contents with the provided encryption password. The decryption module 312 may determine that the encryption password is authentic if the encryption metadata stored within the snapshot of the volume of backup contents matches the provided encryption password.

At block 514, the decrypted volume of data may be provided to the user. For example, the decryption module 314 may provide the one or more selected decrypted portion of the volume of data to the mount module 316. The mount module 316 may read the decrypted volume of data and provide the one or more selected portions of volume of data to the user.

At block 516, the method 500 may end.

Figure 6:
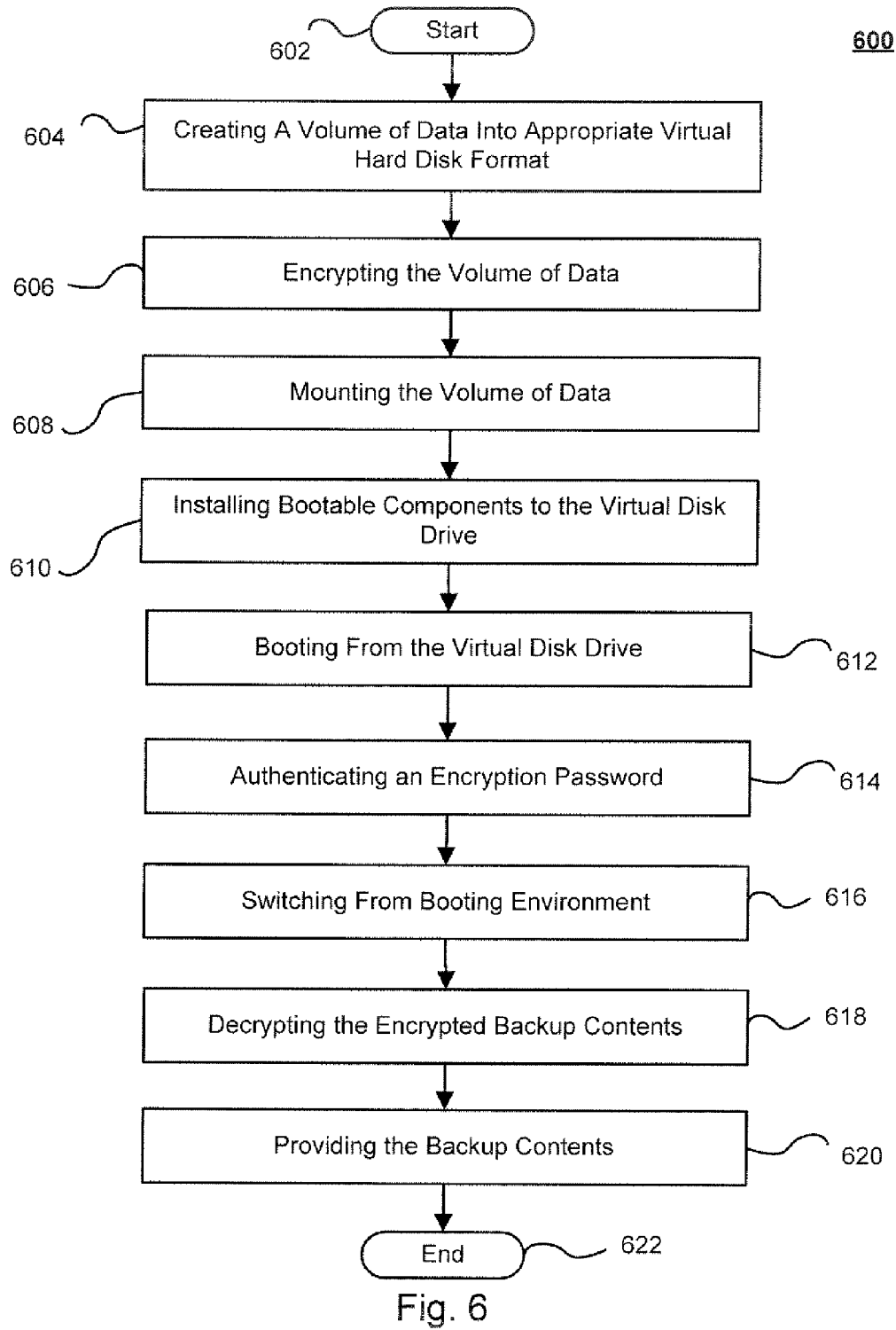
FIG. 6 depicts a method for creating an encrypted bootable virtual hard disk in accordance with an embodiment of the present disclosure.

Referring to FIG. 6, there is depicted a method 600 for creating an encrypted bootable virtual hard disk in accordance with an embodiment of the present disclosure. At block 602, the method 600 may begin.

At block 604, a volume of data may be converted into appropriate virtual hard disk format. The volume of data may be converted into virtual backup file images via the backup module 145. For example, backup module 145 may create a snapshot of the volume of data having at least one virtual backup file image. A snapshot of the volume of backup contents may be a copy or a logical representation of the volume of data at the particular point of time. The volume of data may be used for booting the client 110 or the server 140A. In a particular embodiment, the backup module 145 may include a backup exec system recovery (BESR) application to create a volume of data having at least one virtual backup file image to be mounted onto the virtual hard disk 160 for booting the client 110 or server 140A. The backup module 145 may create one or more blocks of snapshots of the volume of data, wherein each of the one or more blocks having at least one virtual backup file image. The one or more blocks of snapshots of the volume of data may include a boot block which may be used to boot the client 110 and/or the server 140A.

At block 606, the volume of data may be encrypted using a predetermine encryption algorithm. In a particular embodiment, the volume of data may be encrypted by the encryption application 156. Encryption metadata may be stored within the mounted volume of data. For example, the encryption metadata may be stored within a virtual backup file image of the mounted volume of data. In a particular embodiment, the encryption application 156 may not encrypt the boot block of the volume of data. Thus, the encrypted volume of data may be protected from hacking or tampering from unauthorized sources.

At block 608, the snapshot of the volume of data may be mounted to the virtual hard disk 160. For example, the mount module 316 may mount the snapshot of the volume of data to the virtual hard disk 160. The mount module 316 may sequentially mount the one or more blocks of the snapshots of the volume of data to the virtual hard disk 160.

At block 610, various bootable components may be installed to the virtual hard disk 160. In a particular embodiment, the encryption module 314 may be stored or installed on the virtual hard disk 160. In another embodiment, a booting environment may be installed on the virtual hard disk 160. The booting environment (e.g., different from normal operating environment or operating system) may include at least one of a backup exec system recovery (BESR), lightsout Recovery (LOR), system reference documents (SRD), and/or other other bootable components in order to boot the client 110 and/or server 140A.

At block 612, the client 110 and/or the server 140A may be booted from the virtual hard disk 160. For example, an interface module 312 may receive a request to initiating a booting process for the client 110 and/or server 140A. The interface module 312 may pass the request to initiate a booting process to the virtual hard disk access module 318. The virtual hard disk access module 318 may access the encrypted virtual hard disk 160 in order to boot the client 110 and/or the server 140A in a booting environment. In a particular embodiment, the virtual hard disk access module 318 may access the various bootable components stored or installed on the virtual hard disk 160. The virtual hard disk access module 318 may access the booting environment in order to boot the client 110 and/or the server 140A under the booting environment installed in the virtual hard disk 160.

During booting of the client 110 and/or the server 140A in the booting environment, the virtual hard disk access module 318 may access and activate the encryption module 314 installed on the virtual hard disk 160. An encryption password associated with the volume of encrypted data may be provided to the encryption module 314. For example, the encryption application 156 may provide encryption metadata associated with the volume of the encrypted data to the encryption module 314.

At block 614, the encryption module 314 may authenticate the encryption password. For example, the encryption module 314 may authenticate the encryption password against the encryption metadata stored in the volume of data. In a particular embodiment, the encryption module 314 may search the snapshot of the volume of data to find the encryption metadata stored therein. The encryption module 314 may authenticate the encryption password by comparing the encryption metadata stored within the snapshot of the volume of backup contents with the provided encryption password. The encryption module 314 may determine that the encryption password is authentic if the encryption metadata stored within the snapshot of the volume of backup contents matches the provided encryption password. The encryption module 314 may pass the authenticated encryption password to the decryption module 312.

At block 616, the client 110 and/or the server 140A may switch from the booting environment to a different operating environment. For example, backup module 145 may switch the operating environment of the client 110 and/or the server 140A from the booting environment to the normal operating environment (e.g., normal mode of operation for operating system). In a particular embodiment, the booting environment may be different than the normal operating environment. The booting environment may have less function than the normal operating environment.

At block 618, the encrypted volume of data may be decrypted by the decryption module 312. The decryption module 312 may utilize the authenticated encryption password to decrypt one or more encrypted virtual files stored in the virtual hard disk 160 in the normal operating environment. For example, the decryption module 312 may use the encryption password to decrypt one or more users selected encrypted virtual files stored on the virtual hard disk 160 in the normal operating environment to boot the client 110 and/or the server 140A.

At block 620, the decrypted data may be provided to the user. For example, the decryption module 314 may provide the one or more selected decrypted files of the volume of data to the mount module 316. The mount module 316 may read the decrypted volume of data and provide the one or more selected files of volume of data to the user.

At block 622, the method 600 may end.

Figure 7:
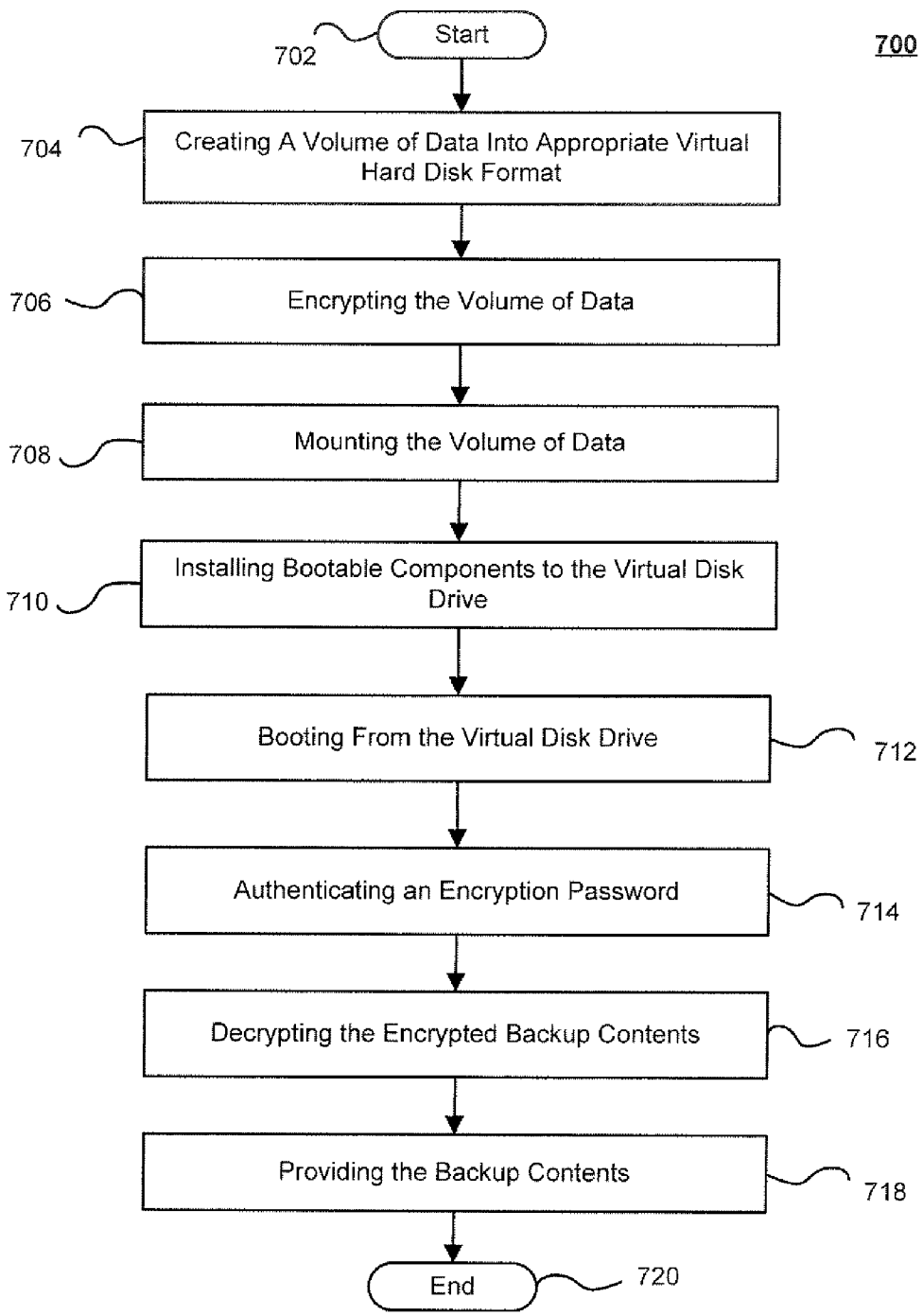
FIG. 7 depicts a method for creating an encrypted bootable virtual hard disk in accordance with an alternative embodiment of the present disclosure.

Referring to FIG. 7, there is depicted a method 700 for creating an encrypted bootable virtual hard disk in accordance with an alternative embodiment of the present disclosure. At block 702, the method 700 may begin.

At block 704, a volume of data may be converted into appropriate virtual hard disk format. The volume of data may be converted into virtual backup file images via the backup module 145. For example, backup module 145 may create a snapshot of the volume of data having at least one virtual backup file image. A snapshot of the volume of backup contents may be a copy or a logical representation of the volume of data at the particular point of time. The volume of data may be used for booting the client 110 or the server 140A. In a particular embodiment, the backup module 145 may include a backup exec system recovery (BESR) application to create a volume of data having at least one virtual backup file image to be mounted onto the virtual hard disk 160 for booting the client 110 or server 140A. The backup module 145 may create one or more blocks of snapshots of the volume of data, wherein each of the one or more blocks having at least one virtual backup file image. The one or more blocks of snapshots of the volume of data may include a boot block which may be used to boot the client 110 and/or the server 140A.

At block 706, the volume of data may be encrypted using a predetermine encryption algorithm. In a particular embodiment, the volume of data may be encrypted by the encryption application 156. Encryption metadata may be stored within the mounted volume of data. For example, the encryption metadata may be stored within a virtual backup file image of the mounted volume of data. In a particular embodiment, the encryption application 156 may not encrypt the boot block of the volume of data. Thus, the encrypted volume of data may be protected from hacking or tampering from unauthorized sources.

At block 708, the snapshot of the volume of data may be mounted to the virtual hard disk 160. For example, the mount module 316 may mount the snapshot of the volume of data to the virtual hard disk 160. The mount module 316 may sequentially mount the one or more blocks of the snapshots of the volume of data to the virtual hard disk 160.

At block 710, various bootable components may be installed to the virtual hard disk 160. In a particular embodiment, the encryption module 314 may be installed on the virtual hard disk 160. In another embodiment, a booting environment may be installed on the virtual hard disk 160. The booting environment (e.g., different from normal operating environment or operating system) may include at least one of a backup exec system recovery (BESR), lightsout Recovery (LOR), system reference documents (SRD), and/other other bootable components in order to boot the client 110 and/or server 140A.

At block 712, the client 110 and/or the server 140A may be booted from the virtual hard disk 160. For example, an interface module 312 may receive a request to initiating a booting process for the client 110 and/or server 140A. The interface module 312 may pass the request to initiate a booting process to the virtual hard disk access module 318. The virtual hard disk access module 318 may access the encrypted virtual hard disk 160 in order to boot the client 110 and/or the server 140A in a booting environment. In a particular embodiment, the virtual hard disk access module 318 may access the various bootable components stored or installed on the virtual hard disk 160. The virtual hard disk access module 318 may access the booting environment in order to boot the client 110 and/or the server 140A under the booting environment installed in the virtual hard disk 160.

During booting of the client 110 and/or the server 140A in the booting environment, the virtual hard disk access module 318 may access and activate the encryption module 314 installed on the virtual hard disk 160. An encryption password associated with the volume of encrypted data may be provided to the encryption module 314. For example, the encryption application 156 may provide encryption metadata associated with the volume of the encrypted data to the encryption module 314.

At block 714, the encryption module 314 may authenticate the encryption password. For example, the encryption module 314 may authenticate the encryption password against the encryption metadata stored in the volume of data. In a particular embodiment, the encryption module 314 may search the snapshot of the volume of data to find the encryption metadata stored therein. The encryption module 314 may authenticate the encryption password by comparing the encryption metadata stored within the snapshot of the volume of backup contents with the provided encryption password. The encryption module 314 may determine that the encryption password is authentic if the encryption metadata stored within the snapshot of the volume of backup contents matches the provided encryption password. The encryption module 314 may pass the authenticated encryption password to the decryption module 312.

At block 716, the encrypted volume of data may be decrypted by the decryption module 312. The decryption module 312 may utilize the authenticated encryption password to decrypt the entire volume of data stored in the virtual hard disk 160 in the booting environment. For example, the decryption module 312 may use the encryption password to decrypt the entire virtual files stored in the virtual hard disk 160 in the booting environment.

At block 718, the decrypted data may be provided to the user. For example, the user may access the entire volume of decrypted virtual hard disk 160 via the virtual hard disk access module 318. The mount module 316 may read the decrypted volume of data and provide one or more selected files of decrypted volume of data stored in the virtual hard disk 160 to the user. Also, the decrypted virtual hard disk 160 may be active and can be accessed in a subsequent booting operation.

At block 720, the method 700 may end.

At this point it should be noted that creating an encrypted virtual hard disk in accordance with the present disclosure as described above typically involves the processing of input data and the generation of output data to some extent. This input data processing and output data generation may be implemented in hardware or software. For example, specific electronic components may be employed in virtual dynamic link library (DLL) module or similar or related circuitry for implementing the functions associated with creating an encrypted virtual hard disk in accordance with the present disclosure as described above. Alternatively, one or more processors operating in accordance with instructions may implement the functions associated with creating an encrypted virtual hard disk in accordance with the present disclosure as described above. If such is the case, is within the scope of the present disclosure that such instructions may be stored on one or more non-transitory processor readable storage media (e.g., a magnetic disk or other storage medium), or transmitted to one or more processors via one or more signals embodied in one or more carrier waves.

The present disclosure is not to be limited in scope by the specific embodiments described herein. Indeed, other various embodiments of and modifications to the present disclosure, in addition to those described herein, will be apparent to those of ordinary skill in the art from the foregoing description and accompanying drawings. Thus, such other embodiments and modifications are intended to fall within the scope of the present disclosure. Further, although the present disclosure has been described herein in the context of a particular implementation in a particular environment for a particular purpose, those of ordinary skill in the art will recognize that its usefulness is not limited thereto and that the present disclosure may be beneficially implemented in any number of environments for any number of purposes. Accordingly, the claims set forth below should be construed in view of the full breadth and spirit of the present disclosure as described herein.

The invention claimed is:

1. A method for encrypting a virtual hard disk comprising:
   creating a volume of data stored on at least one drive to be mounted onto the virtual hard disk at a client;
   encrypting the volume of data using a predetermined encryption algorithm;
   mounting, via at least one computer processor, the encrypted volume of data onto the virtual hard disk at the client;
   storing at least one bootable component on the virtual hard disk;
   booting from the virtual hard disk based on the at least one bootable component stored on the virtual hard disk;
   authenticating an encryption password; and
   changing the client from a booting environment to a different operating environment after the encryption password has been authenticated.

2. The method of claim 1, wherein creating the volume of data comprises creating a snapshot of the volume of data at a particular point in time.

3. The method of claim 1, wherein encrypting the volume of data comprises storing encryption metadata in the volume of data, and wherein a boot block within the volume of data is not encrypted.

4. The method of claim 1, wherein authenticating the encryption password comprises comparing the encryption password with the encryption metadata stored in the volume of data.

5. The method of claim 1, further comprising:
   decrypting the encrypted volume of data using the encryption password based at least in part on an authentication of the encryption password, wherein the decrypting is performed in the different operating environment of the client.

6. The method of claim 5, wherein decrypting the encrypted volume of data comprises decrypting a portion of the encrypted volume of data.

7. The method of claim 5, wherein decrypting the encrypted volume of data comprises decrypting an entire portion of the encrypted volume of data.

8. At least one non-transitory processor readable storage medium storing a computer program of instructions configured to be readable by at least one processor for instructing the at least one processor to execute a computer process for performing the method as recited in claim 1.

9. A method for encrypting a virtual hard disk comprising:
   creating a volume of data stored on at least one drive to be mounted onto the virtual hard disk at a client;
   mounting, via at least one computer processor, the volume of data onto the virtual hard disk at the client;

encrypting the mounted volume of data using a predetermined encryption algorithm;

storing at least one bootable component on the virtual hard disk;

booting from the virtual hard disk based on the at least one bootable component stored on the virtual hard disk;

authenticating an encryption password; and changing the client from a booting environment to a different operating environment after the encryption password has been authenticated.

10. The method of claim 9, wherein creating the volume of data comprises creating a snapshot of the volume of data at a particular point in time.

11. The method of claim 9, wherein encrypting the mounted volume of data comprises storing encryption metadata in the mounted volume of data, and wherein a boot block within the volume of data is not encrypted.

12. The method of claim 9, wherein authenticating the encryption password comprises comparing the encryption password with the encryption metadata stored in the volume of data.

13. The method of claim 9, further comprising:
decrypting the encrypted volume of data using the encryption password based at least in part on an authentication of the encryption password.

14. The method of claim 13, wherein decrypting the encrypted volume of data comprises decrypting a portion of the encrypted volume of data.

15. The method of claim 13, wherein decrypting the encrypted volume of data comprises decrypting an entire portion of the encrypted volume of data.

16. At least one non-transitory processor readable storage medium storing a computer program of instructions configured to be readable by at least one processor for instructing the at least one processor to execute a computer process for performing the method as recited in claim 9.

17. A system for encrypting a virtual hard disk comprising:
a backup module configured to create a volume of data stored on at least one drive to be mounted onto the virtual hard disk at a client;
an encryption module configured to encrypt the volume of data using a predetermined encryption algorithm;
a mounting module comprising at least one computer processor configured to mount the encrypted volume of data onto the virtual hard disk at the client;
a storage module configured to store at least one bootable component on the virtual hard disk;
a booting module configured to boot from the virtual hard disk based on the at least one bootable component stored on the virtual hard disk;
an authenticating module configured to authenticate an encryption password; and
an environment control module configured to change the client from a booting environment to a different operating environment after the encryption password has been authenticated.

18. A system for encrypting a virtual hard disk comprising:
a backup module configured to create a volume of data stored on at least one drive to be mounted onto the virtual hard disk at a client;
a mounting module comprising at least one computer processor configured to mount the volume of data onto the virtual hard disk at the client;
an encryption module configured to encrypt the mounted volume of data using a predetermined encryption algorithm;
a storage module configured to store at least one bootable component on the virtual hard disk;
a booting module configured to boot from the virtual hard disk based on the at least one bootable component stored on the virtual hard disk;
an authenticating module configured to authenticate an encryption password; and
an environment control module configured to change the client from a booting environment to a different operating environment after the encryption password has been authenticated.

19. The method of claim 5, wherein the client is booted based on the decrypted volume of data.

20. The method of claim 5, wherein the volume of data stored on the at least one drive to be mounted onto the virtual hard disk is created by a backup exec system recovery (BESR) application implemented on the client.

* * * * *